United States Patent [19]

Rockland et al.

[11] Patent Number: 4,729,901

[45] Date of Patent: Mar. 8, 1988

[54] PROCESS FOR CANNING DRY BEANS AND OTHER LEGUMES

[75] Inventors: Louis B. Rockland, Moraga; Thomas M. Radke, Santa Ana, both of Calif.

[73] Assignee: Chapman College, Orange, Calif.

[21] Appl. No.: 907,397

[22] Filed: Sep. 15, 1986

[51] Int. Cl.$^4$ ............................................... A23B 9/00
[52] U.S. Cl. .................................... 426/634; 426/407
[58] Field of Search ............... 426/634, 271, 269, 268, 426/562, 521, 407, 508, 507

[56] References Cited

U.S. PATENT DOCUMENTS

| | | | |
|---|---|---|---|
| 2,232,282 | 2/1941 | Struble | 426/634 |
| 2,329,080 | 9/1943 | Raymond | 426/634 |
| 2,400,123 | 5/1946 | Levinson | 426/634 |
| 3,108,884 | 10/1963 | Nielsen | 426/634 |
| 3,318,708 | 5/1967 | Rockland | 426/634 |
| 3,352,687 | 11/1967 | Rockland | 426/271 |
| 3,454,404 | 7/1969 | Watanabe | 426/634 |
| 3,635,728 | 1/1972 | Rockland | 426/634 |
| 3,869,556 | 3/1975 | Rockland | 426/459 |
| 4,159,351 | 6/1979 | Rockland | 426/271 |
| 4,601,910 | 7/1986 | Saub | 426/634 |

FOREIGN PATENT DOCUMENTS 60-34145  2/1985  Japan .................................. 426/634

*Primary Examiner*—Raymond N. Jones
*Assistant Examiner*—Carolyn Paden
*Attorney, Agent, or Firm*—Knobbe, Martens, Olson & Bear

[57] ABSTRACT

A process for preparing canned legumes is disclosed. The process includes the steps of hydrating the legumes in a mixed salt solution for a period equal to about 7% to about 30% of the time necessary to render the legumes fully quick-cooking, where a quick-cooking legume is one that may be cooked for the table in boiling water in 20 minutes or less, and then retorting a hermetically sealed container of the hydrated legumes at a temperature of at least 220° F. until the legumes are cooked and commercially sterilized. The hydrating solution contains sodium chloride and a buffer to maintain an alkaline pH, and may also include a chelating agent and a reducing agent.

26 Claims, No Drawings

PROCESS FOR CANNING DRY BEANS AND OTHER LEGUMES

BACKGROUND OF THE INVENTION

This invention relates to a process for producing superior quality canned legume products.

Many varieties of dry beans (sometimes called shell beans) are available in pre-cooked, canned form. Such pre-cooked canned beans offer numerous advantages in convenience over uncooked dry beans, which require lengthy soaking and cooking before they can be eaten.

However, the quality of typical canned bean products has been notoriously poor. Typically, canned beans have tough, irritating, paper-like seed coats, mushy or granular textures, and metallic or tin-like off flavors. In addition, some varieties of beans, such as large lima beans, often show a blue-gray discoloration defect referred to as "blue-bellies" when canned according to conventional methods.

Typical procedures for canning legume products consist of inspection of the dry legumes, cleaning, soaking, destoning, blanching, inspection, filling the cans, closing the cans, and processing (retorting) to sterilize and cook the canned legumes. See generally, A. Lopez, "A Complete Course in Canning", volume 2, chapter 7 (10th Ed. 1975).

In addition to quality and appearance problems in the finished product, conventional prior art canning methods for dry beans suffer from a number of other disadvantages. For example, beans must be soaked in the soaking step until they have absorbed an amount of moisture equal to approximately 85% to 110% of their dry weight (46% to 52% moisture). Minimum soaking periods range from eight to fourteen hours, depending upon the type of bean and its initial moisture content and soaking temperature. Soaking times of sixteen hours are typical at room temperature and atmospheric pressure. Hard water is generally unsuitable for soaking, because the dissolved calcium and magnesium compounds in the water will harden the legumes, requiring a longer process to make them edible. With very hard water, it may not be possible to obtain an acceptably tender product.

Careful control of the length of the soaking operation is necessary in conventional processes. The moisture content of dried beans may vary from 9% to as much as 20%. The drier and harder beans absorb moisture more slowly than those with a higher moisture content. If high moisture beans are soaked for too long a period they tend to become soft and, as a result, split and become mushy during processing. The relatively long soaking times required even for beans with higher moisture contents often lead to problems of souring caused by growth of microorganisms in the soaking medium and by enzymatic and biochemical changes in the legume during germination, as a result of hydration.

Due to variations in moisture content of the beans, prior art processes require careful control of the fill-in ratio. The fill-in ratio is the weight ratio of beans to liquid in the can. Beans absorb additional moisture as they cook within the can during the retorting process.

Government regulations require that canned legumes be processed for a sufficient period of time to achieve commercial sterility. Commercial sterility, as used herein, means the practical absence of microorganisms having public health significance, as well as more innocuous organisms, that are capable of reproducing in the food during normal unrefrigerated storage and distribution. Typical processing times in a still retort, by necessity, range anywhere from 45 to 235 minutes at 240° F. depending on can size and sauce formulation. Moreover, it is common practice to overprocess from 10% to 50% more than the time required for sterilization in order to insure that all the beans are completely cooked and that tough beans are tenderized. Unfortunately, such overprocessing exacerbates the problems of split seed coats and mushy, poor quality product.

One of the major innovations in legume-processing technology in recent years has been the so called "quick-cooking" processing method. Although quick-cooking technology has not been generally applied to canned legume products processed in still retorts, it represents a major advance in the preparation of dried, frozen or refrigerated hydrated legume products, and marinated mixed bean salads which are processed in rotary retorts. See generally U.S. Pat. Nos. 3,318,708, 3,352,687, 3,635,728, 3,869,556, and 4,159,351, all to Rockland, et al. Quick-cooking technology involves soaking the beans or other legumes in a special hydrating medium (a "quick-cooking salt solution") containing sodium chloride, a bicarbonate-carbonate buffer combination, and a chelating agent. The process described in the '708 Patent includes the step of alternately applying and releasing a vacuum while the legume seeds are hydrating. In '728, beans are blanched in boiling water for a short period prior to soaking in the hydrating medium. In '351, a number of different bean varieties are treated to render them fully quick-cooking and are heated for a very brief period only to remove undesirable color in the cook water before thermal processing. In that process, a rotary retort is required because beans hydrated in accordance with the prior art and cooked in a still retort, either with or without a post-soak blanch, are soft and unacceptable in texture, flavor, and appearance.

Although quick-cooking technology is known to greatly improve the quality of prepared dried beans and other legumes, it has not been applied to canned beans in general for several reasons. In the first place, the hydration times for quick-cooking processes generally correspond to the required hydration times in conventional canning processes. Thus, quick-cooking technology would result in no savings in time but would increase the production cost because of the necessity of providing special soaking solutions. Moreover, the still retort times during the processing step necessary to achieve a commercially sterile product generally correspond to the time required to cook conventionally processed beans. Those same processing times, however, greatly exceed the processing times required to cook fully processed quick-cooking legumes, and would be expected to produce a greatly overcooked product with split seed coats and a mushy texture.

In light of the foregoing disadvantages of prior art processes, the present invention has several objects, including greatly reducing the long soak period of prior art processes, eliminating the necessity of overcooking canned legumes in order to tenderize them, eliminating blue-bellies, eliminating the necessity of using softened water in the soaking process, reducing the variations necessary in the fill-in ratio, minimizing or eliminating the problems involving souring and metabolism during the soaking process, and greatly improving the texture and quality of the canned product.

Legumes processed in accordance with the present invention have the optimum appearance, texture, flavor and color. There is no other method known that will produce this effect from standard or totally processed quick-cooking beans.

SUMMARY OF THE INVENTION

The present invention involves a process for preparing canned legumes, comprising the steps of hydrating the dry legumes in a quick-cooking salt solution for a period of time significantly less than is used in conventional quick-cooking hydration, for a total hydration time equal to between about 7% and about 30%, preferably between about 8% and about 25%, and most preferably between about 10% and about 20% of the soaking time required to render the legumes fully quick-cooking, wherein the exact hydration time varies according to the variety and condition of the dry legumes; hermetically sealing the hydrated legumes in containers with a liquid; and retorting the container of legumes until the legumes are cooked and commercially sterilized. According to the present invention, legumes are processed for less than the optimum time required to produce fully quick-cooking legumes. Although legumes which have been hydrated to be fully quick-cooking would be greatly overcooked during the sterilization step, legumes prepared under the present method are not hydrated to the degree of fully quick-cooking legumes and have longer cooking times which correspond to the times needed to achieve commercial sterility. The legumes may be blanched before and/or after the hydrating step. The hydrating solution preferably contains sodium chloride, a bicarbonate-carbonate buffer combination, a chelating agent, and also preferably contains a reducing agent. According to another embodiment of the invention, the hydrating solution is initially heated and then is allowed to cool while the legumes are hydrating.

In accordance with further embodiment of the invention, a process for preparing canned large lima beans is provided, comprising the steps of hydrating dry large lima beans in an aqueous mixed salt solution for a period equal to between about 10% and about 20% of the time necessary to render the beans quick-cooking, periodically applying and releasing a vacuum over the hydrating beans for at least a part of the hydrating period; hermetically sealing the hydrated beans, together with a liquid, in a container; and retorting the container of beans at a temperature of at least 220° F. in a still retort until the beans are commercially sterilized and cooked.

In accordance with still another aspect of the present invention, a process for preparing canned small white beans is provided, comprising the steps of hydrating dry small white beans in an aqueous mixed salt solution for a period equal to between about 10% and about 20% of the time necessary to render the beans quick-cooking; hermetically sealing the hydrated beans together with a liquid in a container; and retorting the container of beans in a still retort at a temperature of at least 220° F. until the beans are cooked and commercially sterilized.

Canned legumes prepared according to the present invention exhibit greatly improved texture and quality. The objectionable metallic taste of many conventionally processed canned beans is noticeably absent. Moreover, the common discoloration problem referred to as "blue bellies" is significantly reduced or eliminated by application of the present invention.

A primary advantage of the invention is that, even for beans which would normally require soaking periods up to 24 hours to render them quick-cooking, soaking periods are reduced to a fraction of the time required in the prior are representing a savings of 50 to 90% over the normal time used by canners. Thus, soaking tanks can be utilized on an hourly rather than a daily basis. The shorter hydration times require less labor and increase plant capacity by improving utilization of processing equipment. In addition, increased equipment usage will lower amortization times and thus decrease net capital equipment costs.

The necessity of pre-conditioning the water supply to make it soft for blanching, soaking, and sauce preparation is obviated by the use of the special hydration medium. Unlike legumes conventionally processed in soft water, the beans processed in accordance with this invention will soften in proportion to the hardness of the legume. The hydration medium will soften hard legumes to a greater degree than soft legumes, thus bringing both to equal or optimal tenderness. This obviates the problem of mushy legumes if the processing water has been softened too much, or beans having hard texture if the water has not been softened enough. In addition, the tenderizing effect of the hydration medium works equally well on very hard legumes (old legumes that have been stored at less than optimum conditions and therefore take a very long time to cook) which may not process into an acceptable product using normal processing.

The usual practice of overprocessing from 10 to 50% above the time required for sterilization is not necessary because the modified quick-cooking process will soften the legumes to a uniform and smooth texture in a time usually shorter than that required for sterilization. Legumes processed according to the invention retain their integral character, do not become mushy, and seedcoats do not slough off during processing, even if overcooked. Therefore, a significant savings in time, labor, and energy and a significant reduction in wasted product is affected by use of this invention.

Another significant advantage of the present invention is that it decreases the possibility of microbiological contamination. The hydration medium "kills" the legume, thus halting essentially all metabolic and sprouting processes associated with germination that otherwise occur during soaking in plain water. The salt mixtures used for soaking are natural inhibitors of bacterial growth, reducing the possibility of "souring" during soaking and eliminating the need to frequently change the soaking water. This affords an additional savings in labor, time, money, and water.

It might be expected that the short hydration period used in this invention would require more accurate adjustment of the fill-in ratio of legumes to sauce as in conventional short soaking procedures. But, on the contrary, less control is actually needed because the legumes as herein processed hydrate more fully, making variations in moisture content of dry legumes less significant than normal and thus providing the uniform filling conditions preferred by canners.

DETAILED DESCRIPTION OF THE PREFERRED EMBODIMENTS

As an optional but preferred first step of the process of the present invention, legumes may be treated before hydration by holding them in boiling water for about ½ to 3 minutes, depending on variety, or in live steam for about 1 to 6 minutes. Such blanching pretreatment markedly shortens the time required for hydration and works also as an added cleaning measure. Next, soaking is carried out for a period equal to between about 10% and about 20% of the soaking time necessary to render the legumes fully quick-cooking at ambient pressure. This time will vary depending on the type and characteristics of the legume. A fully quick-cooking legume is one that may be cooked for the table in an open pot in boiling water in 20 minutes or less.

The impregnation of the legumes with the hydration medium may be accomplished in various ways; for example, by soaking the legumes in the hydration medium at atmospheric pressure, by applying a vacuum application and release treatment as hereinafter described, or by both methods in combination. In any event, the impregnation is continued until the total moisture content of the legumes is brought to an optimum level.

In one embodiment of the invention, the impregnation process is enhanced by a vacuum application and release technique. In utilizing this procedure, the legumes are placed in a vessel with an excess of hydrating medium, e.g., the weight of the hydrating medium is from about 2 to 5 times the weight of the legumes, and ordinarily about three times the weight of the legumes. The vessel is sealed and a 15 to 30 inch (380 to 760 mm/Hg) vacuum is applied on the system for 5 minutes, then released for 5 minutes. Depending on such factors as the type of legume and its hydration resistance, anywhere from 1 to 20 cycles may be required. The cycle of application and release of vacuum may be repeated until the legumes are hydrated to the desired extent. Preferably, however, the cycling is repeated only as many times as necessary to ensure essentially complete removal of interstitial air from the legumes; generally 3 to 6 cycles. The legumes are then allowed to soak at atmospheric pressure in the medium to complete the hydration and salt infusion.

The special hydration medium used for soaking is water containing certain additives which provide advantageous results that cannot be obtained with water alone. These useful results are exerted both during and after the hydration (impregnation) step. Thus, since the additives are present in the medium which penetrates throughout the legumes when they are hydrated, the additives can exert their desired activity at the hydration stage. Moreover, since the additives remain distributed throughout the legume tissues after hydration, they can exert their influence in subsequent treatment of the legumes, for example, in blanching, retorting, storage, and consumption thereof.

As discussed in the aforementioned patents '708, '687, '728, '351 and '556, which are hereby incorporated by reference, the hydration medium additives have heretofore been used to produce a product that is fully quick-cooking, i.e., one that can be prepared for the table by heating in boiling water for a period of 20 minutes or less in an open pot. In addition, quick-cooking legumes have a smooth, uniform texture and enhanced flavor. Surprisingly, these same advantages are obtained in the edible-canned legume products prepared according to the present invention, despite much shorter hydration times and much longer cooking times.

Thus, during the hydration step, these agents cause a tenderizing of the legume tissue, particularly of the skins. Such action is, of course, very desirable because the skins exhibit an especially tough and impervious nature. Moreover, when the products of the invention are cooked, the tenderizing agents distributed in the legume tissue cooperate with the applied heat and moisture to cause a further and rapid tenderizing of both cotyledons and skins, yet without causing substantial sloughing or other physical disruption of the individual legumes.

The primary ingredients of the hydration medium are sodium chloride, a bicarbonate-carbonate buffer combination, and an optional chelating agent. The sodium chloride has the principal effect of softening the skins. Sodium chloride is present in the hydrating medium in a concentration of about 0.5% to 5% by weight, but is usually from 1% to 3% by weight and preferably about 2% by weight. The buffer exerts a variety of useful effects, including the following: (1) It softens the pellicle or seedcoat (testa). (2) It aids in the solubilization of proteins, such as those in the cotyledons. (3) It acts as a buffer to maintain pH. (4) It facilitates uniform penetration of additives into the centers of the cotyledons, so that the final products have a uniformly smooth texture.

In practice, various conventional chelating agents may be used, such as the alkali metal salts of ethylenediaminetetraacetic acid (hereinafter "EDTA"), alkali metal pyrophosphates or tripolyphosphates, or citric acid or its alkali metal salts. Generally, the chelating agent is added to the hydrating medium in a concentration of from about 0.1 to 5% by weight. Particularly preferred is the conjoint use of sodium tripolyphosphate and tetrasodium EDTA—for example, 1% of the former; 0.5% of the latter, to provide especially good results while using a minimum amount of the chelating agents.

For best results, it is preferred that the hydrating medium be slightly alkaline, that is, have a pH of from about 8 to 9.5, and preferably about 9. Depending on the buffer selected, this value may be attained directly, or it may be necessary to add an alkaline material, for example, sodium hydroxide, or more preferably, sodium carbonate or bicarbonate or the corresponding potassium salts. The carbonate or bicarbonate not only acts as an alkaline agent and buffer but also acts as a protein dissociating, solubilizing, or tenderizing agent. Particularly good results are attained with a mixture of sodium carbonate and sodium bicarbonate in a ratio of about 1:3. The preferred embodiment of the hydrating medium contains these components in concentrations of about 0.15% anhydrous sodium carbonate and 0.45% sodium bicarbonate by weight, but the concentration of sodium carbonate can range from about 0.0% to 0.3% and the concentration of sodium bicarbonate can range from 0.1% to 1.5%.

Optionally, the hydration medium may contain additional agents. For example, it is preferred to include a trace amount (about 0.01 to 0.05%) of a reducing agent such as a sodium or potassium salt of sulfite or bisulfite, sodium sulphide, cysteine, ascorbic acid, sodium mercaptoglycollate and combinations, or the like to assist in stabilizing color. Alternatively, the reducing agent may be added to the brine or sauce which is combined with the hydrated legumes before processing. An edible-grade surface active agent such as polyoxyethylene sorbitan palmitate or stearate may be added in minor concentration (about 0.05 to 0.5%) to assist penetration of the medium into the seeds.

The hydration time of about 7% to about 30%, preferably about 8% to about 25%, and most preferably about 10% to about 20% of the time required to render the legumes fully quick-cooking is a value that varies, depending on the legume variety, the age of the legume, and conditions under which it has been stored. It can, however, be readily determined by simple testing of any particular legume in question. Actual hydration times used herein usually are between about ½ hour and 3 to 4 hours.

The hydration of the legumes may be conducted at ambient (room) temperature or at temperatures above or below the ambient. In the soaking operation, elevated temperatures may be employed to expedite the hydration and tenderization of the legumes. However, the chemical interactions between the hydration medium and the legumes produce optimum results at temperatures with an upper limit of about 50°–55° C. Higher hydration temperature may cause discoloration, off-odors and -flavors, and granular texture if the higher temperature is maintained for an extended period.

Another optional hydration procedure using elevated temperatures consists of: (1) placing dry legumes in boiling water for ½ to 3 minutes; (2) removing the heat source from vessel holding the legumes without draining the hot water; (3) dissolving the special hydration additive mixture in the hot solution; and (4) letting the legumes hydrate and cool at ambient temperature for a total hydration time equal to about 7% to about 30%, and preferably about 10% to about 20% of the soaking time required to render the beans fully quick-cooking. Gradual ambient cooling circumvents the problems resulting from higher hydration temperatures mentioned above.

After the legumes are hydrated they may be washed with water to remove the hydrating medium from the surface of the legumes. This washing step is optional and may be omitted.

Prior to canning and after soaking, blanching may be required for some legume varieties in order to insure that optimum texture, flavor and appearance are retained after thermal processing in a still retort. This entails placing the legumes in hot water (about 90°–100° C.) for ½ to 12 minutes, preferably 5 minutes or less. The blanching time varies with the variety of legume and in any particular case can be ascertained using small pilot trials. Blanching after hydration is performed for one or more of the following reasons:

(1) Seedcoats tend to toughen when processed in low pH or acidic brines; therefore, blanching may be employed to pretenderize the seedcoats and thus obviate the problem.

(2) If the legumes have not reached optimum moisture content (about 49–62% moisture) during soaking, blanching will complete hydration to the optimal desired level.

The hydrated legumes are placed in a container together with a brine or sauce. Containers may be of any type suitable for processing, i.e. tin plate cans with or without enamel linings or coatings, aluminum cans, flexible or semi-rigid containers, glass containers, and the like. Containers made from fully enameled electrolytic tinplate are preferred. After the container is sealed, it is processed to cook the legumes and to sterilize its contents. The containers are then ready for distribution to the consumer. The invention may be applied to cans processed under pressure in water or in pure saturated steam by various sterilization procedures; for example, batch-type, nonagitating, vertical or horizontal retorts (still retorts).

The product of the invention has an excellent color, flavor, texture and appearance. The cooked legumes are firm, yet tender, and do not fall apart or slough their seed coats. In addition, the natural flavor of the legume is enhanced.

The process of the present invention has broad application. Products of the invention can be prepared from legumes of all types, i.e., beans of the genus Phaseolus, including common beans such as large white, small white, pinto, red kidney, cranberry, and lima; the genus Pisum, including smooth and wrinkled peas; the genus Vigna, including the blackeye beans (also termed blackeye peas or cowpeas); the genus Lens including lentils; the genus Cicer including garbanzo or chick peas; and the genus Soja, that is soybeans.

EXAMPLE 1

The following experiment was performed to determine the relationship between moisture content, hydration period, blanching time and final product quality.

White-seedcoat baby lima beans were blanched for 2 minutes in boiling water and then soaked in approximately three times their weight of water containing, by weight, 2.0% sodium chloride, 0.45% sodium bicarbonate, 0.15% sodium carbonate and 1.0% sodium tripolyphosphate. Soaking was carried out in separate lots for 1, 2, and 4 hours. Small samples from each hydration period were then separately blanched for 0, 1.5, 3, 6, and 12 minutes. The moisture content of each sample was determined with an Ohaus moisture determination balance. The hydration time required to render baby lima beans fully quick-cooking is about 18–24 hours. The results are tabulated below.

TABLE 1

| Hydration period | PERCENT MOISTURE CONTENT OF HYDRATED BABY LIMA BEANS | | | | |
|---|---|---|---|---|---|
| | Posthydration Blanch Time | | | | |
| | 0 min | 1.5 min | 3.0 min | 6.0 min | 12.0 min |
| 1 hour | 47.0% | 55.0% | 57.5% | 60.5% | 63.0% |
| 2 hours | 53.5% | 58.0% | 59.5% | 62.0% | 64.5% |
| 4 hours | 55.0% | 59.0% | 62.0% | 64.0% | 65.5% |
| 16 hours** | 59.0% | — | — | — | 60.0% |

**Hydrated in plain water without additives

The quality of the products of Example 1 was determined in a separate parallel experiment. The above experiment was repeated except bean samples soaked for 1 hour were blanched for 3, 6, and 12 minutes; 2 hour samples for 1.5, 3 and 6 minutes; and 4 hours samples for 0, 1.5 and 3 minutes. After blanching, 8 ounces of each bean sample were filled into 300×407 cans, which were then filled with tomato-based sauce, sealed and retorted in a still retort for 60 minutes at 240° F. Quality judgments determined by lab personnel are given in Table 2.

TABLE 2

| Hydration period | QUALITY EVALUATIONS OF CANNED BABY LIMA BEANS | | | | |
|---|---|---|---|---|---|
| | Posthydration Blanch Time | | | | |
| | 0 min | 1.5 min | 3.0 min | 6.0 min | 12.0 min |
| 1 hour | — | — | GOOD | GOOD | EXCELLENT |
| 2 hours | — | GOOD | VERY GOOD | EXCELLENT | — |
| 4 hours | GOOD | EXCELLENT | EXCELLENT | — | — |

TABLE 2-continued
QUALITY EVALUATIONS OF CANNED BABY LIMA BEANS

| Hydration period | Posthydration Blanch Time | | | | |
|---|---|---|---|---|---|
| | 0 min | 1.5 min | 3.0 min | 6.0 min | 12.0 min |
| 16 hours** | FAIR | — | — | — | FAIR |

DEFINITIONS OF QUALITY TERMS

| | |
|---|---|
| EXCELLENT: | creamy smooth and uniform texture including seedcoat; enhanced natural bean flavor without typical canned flavor; no irritating paper-like seedcoat; no discoloration |
| VERY GOOD: | seedcoats slightly noticeable; excellent flavor and texture |
| GOOD: | seedcoats slightly tough; cotyledons have slightly granular texture |
| FAIR: | tough seedcoats; granular or mealy textured cotyledon; bland or typical canned flavor |

**Hydrated in plain water without additives

For comparative purposes, two samples of canned baby lima beans in tomato sauce were prepared as above except that they were soaked conventionally in plain water for 16 hours. One sample was canned without blanching and the other was blanched for 12 minutes. These samples rated 'fair' with very tough seedcoats and granular or mealy textures. The baby lima bean flavor was bland, detracting from rather than enhancing the sauce flavor. It is important to note that the lowest quality products produced by this invention (good rating) were still superior to beans canned in the conventional manner.

As indicated in the above tables, hydration period and blanch time have an interactive relationship. A moisture content of at least 62% will allow excellent quality canned beans. But when the soaking time is 4 hours, 59% moisture will also provide an excellent quality product. In contrast, the beans soaked conventionally for 16 hours produce only fair quality product whether blanched or not.

It should be noted that blanching may not be necessary if light colored legumes are being canned (no colored-seedcoat leaching problem) or if the legumes attain about 62% moisture during the soaking period. For example, large lima beans hydrate to 62% moisture content in 2 hours using the vacuum infiltration technique and, therefore, require no blanching after hydration.

EXAMPLE 2

A solution was prepared containing water and the following ingredients:

| | Percent by weight |
|---|---|
| Sodium chloride | 1.0 |
| Sodium bicarbonate | 0.45 |
| Sodium carbonate, monohydrate | 0.176 |
| Sodium tripolyphosphate | 0.5 |
| Sodium bisulfite | 0.05 |

Large, white lima beans were placed in a vessel together with enough of the foregoing quick-cooking salt solution to cover them. The amount of solution required is equal to approximately three times the weight of the beans. The vessel was closed and connected to a source of vacuum. The vacuum was maintained for five minutes, then released. After another five minutes the vacuum was again applied, held for five minutes, then released, and so on. In all, 3 cycles of vacuum application and release were used. The system was then allowed to stand, at room temperature and atmospheric pressure, with the beans in contact with the solution for 1½ hours. Following residence in the hydration medium, 7.6 ounces of hydrated beans were weighed into size 300×407 C-enamel tin cans.

A brine solution was prepared containing water and the following ingredients:

| | Percent by Weight |
|---|---|
| Sugar | 2.25 |
| Sodium chloride | 1.00 |

The brine was heated to boiling and poured into each can leaving about a ¼" headspace. The cans were sealed and placed in a still retort for 40 minutes at 240° F. The resulting product exhibited several advantages over traditionally canned large lima beans. The beans had a firm but uniformly tender texture without noticeable seedcoats. The appearance was creamy white with none of the blue-gray discoloration commonly seen in commercially canned large lima beans. The product had an enhanced, natural large lima bean flavor without the typical off-flavors found in conventional canned large lima beans.

The hydration time required to render large lima beans fully quick-cooking is about 18-24 hours.

EXAMPLE 3

Three samples of large lima beans (A, B and C) were processed as in Example 2 except as indicated in the following Table 3.

TABLE 3

| | Canned large lima bean samples | | |
|---|---|---|---|
| Processing conditions | A | B | C |
| Soak solution (% by weight) | | | |
| Sodium chloride | 1.0 | 1.0 | 0 |
| Sodium bicarbonate | 0.45 | 0.45 | 0 |
| Sodium carbonate | 0.15 | 0.15 | 0 |
| Sodium tripolyphosphate | 1.0 | 1.0 | 0 |
| Water | 97.4 | 97.4 | 100 |
| Brine solution (% by weight) | | | |
| Sodium chloride | 1.0 | 1.0 | 1.0 |
| Sugar | 2.25 | 2.25 | 2.25 |
| Disodium EDTA | 0.02 | 0.02 | 0.02 |
| Sodium bisulfite | 0.05 | 0 | 0 |

TABLE 3-continued

|  | Canned large lima bean samples | | |
|---|---|---|---|
| Processing conditions | A | B | C |
| Quality Evaluation: | Excellent | Good | Fair |

The quality evaluations reveal that products produced by this invention are much superior to those hydrated in plain water (Sample C) and that the reducing agent is effective in improving product quality when added to the brine instead of the soaking solution.

EXAMPLE 4

A solution was prepared containing water and the following ingredients:

|  | Percent by weight |
|---|---|
| Sodium chloride | 2.00 |
| Sodium bicarbonate | 0.45 |
| Sodium carbonate | 0.15 |
| Sodium tripolyphosphate | 1.00 |

California small white beans were blanched in boiling water for one minute, drained, and placed in a vessel together with enough solution to cover them. The amount of solution required is equal to approximately three times the weight of beans. The system was allowed to stand at room temperature and at atmospheric pressure with the beans in contact with the solution for 2 hours. Following residence in the hydration medium, the drained beans were placed in fresh boiling water and blanched for 5 minutes. Size 300×407 C-enamel tin-cans were filled with 7.5 ounces of blanched beans.

A sauce was prepared containing water and the following ingredients:

|  | Percent by weight |
|---|---|
| Sugar | 9.25 |
| Tomato paste (32% solids) | 5.25 |
| Salt | 1.31 |
| Vinegar | 0.87 |
| Onion powder | 0.66 |
| Spices | 0.30 |

The pH of the sauce was 4.1; Brix was 14.

The sauce was heated to at least 190° F. and poured into each can leaving about ¼" headspace. The cans were sealed and placed in a still retort for 55 minutes at 240° F. The product had excellent appearance and flavor with a smooth uniform texture including a tender seedcoat (despite the acidic sauce) and was superior in all respects to available commercial products.

The hydration time required to render California small white beans fully quick-cooking is about 18–24 hours.

EXAMPLE 5

A solution was prepared conaining water and the following ingredients:

|  | Percent by weight |
|---|---|
| Sodium chloride | 2.0 |
| Sodium bicarbonate | 0.45 |
| Sodium carbonate, monohydrate | 0.176 |

Blackeye beans were placed in a vessel together with enough of the solution to cover them. The system was allowed to stand at room temperature and at atmospheric pressure with the beans in contact with the solution for one hour. Following residence in the hydration medium, the drained beans were placed in fresh boiling water and were blanched for two minutes. Five and one half ounces blanched beans, together with a tomato-based sauce, were filled into size 300×407 C-enamel cans, sealed and retorted as in Example 4. The product had excellent appearance, flavor, and texture, including a tender seedcoat. No chelating agent was necessary because of the relatively tender nature of the seedcoat of this particular legume.

The hydration time required to render blackeye beans fully quick-cooking is about 16 hours.

EXAMPLE 6

Three kilograms of baby lima beans were blanched for one minute in nine liters of boiling water. The stockpot containing beans and water was removed from the heating source. A special hydration additive mixture weighing 165.5 grams was added to the beans and stirred until dissolved in the hot solution. The hydration additive mixture was prepared according to the following formula:

|  |  |
|---|---|
| Sodium chloride | 180.0 grams |
| Sodium bicarbonate | 27.0 grams |
| Sodium carbonate, monohydrate | 13.5 grams |
| Sodium tripolyphosphate | 45.0 grams |

The baby lima beans were allowed to hydrate for two hours and were then drained. During hydration the medium had cooled to a final temperature of about 35° C. Seven ounces of hydrated beans were weighed into 300×407 C-enamelled tin-cans and finish filled with brine heated to boiling. The brine solution was prepared according to the following formula:

|  |  |
|---|---|
| Water | 6 liters |
| Sodium chloride | 60 grams |
| Sucrose | 135 grams |
| Malic acid | 6 grams |

The cans were sealed and processed for 40 minutes at 240° F. The product had a very good appearance, flavor and texture including a tender seedcoat.

The hydration time required to render baby lima beans fully quick-cooking is about 18–24 hours.

Typical processing conditions for several varieties of beans are summarized in Table 4.

TABLE 4

| Product | Pre-soak Blanch Time | Total Hydration Time[1] | Post-soak Blanch Time | Bean Fill Weight | Process Time at 240° F. in #300 cans |
|---|---|---|---|---|---|
| Large lima in brine | 0.0 min. | 2.0 hrs.[2] | 0.0 min. | 7.6 oz. | 40 min |
| Blackeye in sauce | 0.0 min. | 1.0 hrs. | 2.0 min. | 5.5 oz. | 55 min. |
| Baby lima in sauce | 1.0 min. | 2.0 hrs. | 5.0 min. | 7.5 oz. | 55 min. |
| Baby lima in brine | 1.0 min. | 2.0 hrs. | 0.0 min. | 7.0 oz. | 40 min |
| Small | 1.0 | 2.0 hrs. | 5.0 | 7.5 oz. | 55 min. |

TABLE 4-continued

| Product | Pre-soak Blanch Time | Total Hydration Time[1] | Post-soak Blanch Time | Bean Fill Weight | Process Time at 240° F. in #300 cans |
|---|---|---|---|---|---|
| white in sauce | min. | | min. | | |

NOTES:
[1]Hydrating temperature for all varieties was 25° C., except for the baby lima in brine, for which hydration started at about 90° C., then ambient cooled for two hours, finishing at about 30° C.
[2]Includes an initial 30 minutes of vacuum infiltration.

What is claimed is:

1. A process for preparing canned legumes, comprising the steps of:
    providing an aqueous hydrating medium capable of imparting quick cooking properties to said legumes, said medium containing about 1-3% by weight sodium chloride and a mixed carbonate/bicarbonate buffer to maintain the medium at a pH of about 8 to 9.5;
    soaking dry legumes in said aqueous hydrating medium for a time of about ½ hour to 4 hours that is equal to between about 7% and about 30% of the time in said medium that would be necessary to render said legumes fully quick-cooking, wherein a fully quick cooking legume is a legume that may be cooked for the table in boiling water 20 minutes or less;
    hermetically sealing the soaked legumes in a container with a liquid different from said hydrating medium; and
    thermally processing the container of legumes in a still retort until said legumes are cooked and commercially sterilized.

2. The process of claim 1, further comprising the step of blanching said legumes prior to said sealing step.

3. The process of claim 1, wherein said hydrating step comprises heating said hydrating medium to about boiling, adding dry legumes to said heated medium and maintaining said legumes in said medium for said soaking time while permitting said medium to cool.

4. The process of claim 1, wherein said hydrating medium further contains a chelating agent.

5. The process of claim 4 wherein said hydrating medium further contains a reducing agent.

6. The process of claim 5, wherein said reducing agent is an alkali metal salt of sulfite or bisulfite.

7. The process of claim 4, wherein said chelating agent comprises tripolyphosphate.

8. The process of claim 1, wherein the liquid in the containers includes a reducing agent.

9. The process of claim 1, wherein said hydrating step is performed at about ambient temperature.

10. The process of claim 1, wherein said soaking time is equal to between about 10% and about 20% of the time that would be necessary to render said legumes fully quick-cooking.

11. A process for preparing canned beans, comprising the steps of:
    preparing a heated aqueous mixed salt solution capable of imparting quick cooking properties to said beans, said solution containing about 1-3% by weight sodium chloride and a mixed carbonate/bicarbonate buffer to maintain the solution at a pH of about 8 to 9.5;
    soaking said beans in said salt solution for a time of about ½ to 4 hours that is equal to between about 7% and about 30% of the time in said solution that would be necessary to render said beans fully quick-cooking and maintaining said beans in said solution while allowing said salt solution to cool, wherein a fully quick cooking bean is a bean that may be cooked for the table in boiling water in 20 minutes or less;
    placing said soaked beans in a container with a liquid different from said salt solution and sealing said container; and
    thermally processing said beans in said container in a still retort until said beans are cooked and commercially sterilized.

12. The process of claim 11, further comprising the step of providing a reducing agent in either the salt solution or the liquid in the hermetically sealed container.

13. The process of claim 12, wherein said reducing agent is an alkali metal salt of sulfite or bisulfite.

14. The process of claim 11, wherein said soaking time is equal to between about 10% and about 20% of the time in said solution that would be necessary to render said beans fully quick-cooking.

15. The process of claim 11, wherein said solution further contains tripolyphosphate.

16. A process of preparing canned large lima beans, comprising the steps of:
    preparing a heated aqueous mixed salt solution capable of imparting quick cooking properties to said beans, said solution containing about 1-3% by weight sodium chloride and a mixed carbonate/bicarbonate buffer to maintain the solution at a pH of about 8 to 9.5, said solution having a temperature of about boiling;
    placing said solution in a vessel capable of maintaining a vacuum;
    soaking dry large lima beans in said aqueous mixed salt solution in said vessel for a time of about ½ to 4 hours that is equal to between about 7% and about 30% of the time in said solution that would be necessary to render said large lima beans fully quick-cooking, wherein a fully quick-cooking large lima bean is a lima bean that may be cooked for the table in boiling water in 20 minutes or less;
    periodically applying and releasing a vacuum in said vessel over the soaking beans for at least a part of said soaking period;
    hermetically sealing the soaked beans, together with a liquid different from said salt solution, in a container; and
    thermally processing the container of beans in a still retort until said beans are cooked and commercially sterilized.

17. The process of claim 16, further comprising the step of providing a reducing agent in either the salt solution or the liquid in the hermetically sealed contained.

18. The process of claim 17, wherein said reducing agent is an alkali metal salt of sulfite or bisulfite.

19. The process of claim 16, wherein said soaking time is equal to between about 10% and about 20% of the time in said solution that would be necessary to render said beans fully quick-cooking.

20. The process of claim 16, wherein said solution further contains tripolyphosphate.

21. A process for preparing canned small white beans, comprising the steps of:

preparing an aqueous mixed salt solution capable of imparting quick cooking properties to said beans, said solution containing about 1-3% by weight sodium chloride and a mixed carbonate/bicarbonate buffer to maintain the solution at a pH of about 8 to 9.5;

soaking dry small white beans in said aqueous mixed salt solution for a time of about ½ to 3 hours that is also equal to between about 7% and about 30% of the time that in said solution that would be necessary to render said beans fully quick-cooking, wherein a fully quick-cooking bean is a bean that may be cooked for the table in boiling water in 20 minutes or less;

hermetically sealing the hydrated beans, together with a liquid different from said salt solution, in a container; and thermally processing the container of beans in a still retort until said beans are cooked and commercially sterilized.

22. The process of claim 21, further comprising the steps of blanching said beans prior to said sealing step.

23. The process of claim 22, wherein said beans are blanched both before and after the hydrating step.

24. The process of claim 23, wherein said processing step is carried out at a temperature of at least 220° F.

25. The process of claim 21, wherein said soaking time is equal to between about 10% and about 20% of the time in said medium that would be necessary to render said beans fully quick-cooking.

26. The process of claim 21, wherein said solution further contains tripolyphosphate.

* * * * *